US009235705B2

(12) United States Patent
Freericks et al.

(10) Patent No.: US 9,235,705 B2
(45) Date of Patent: Jan. 12, 2016

(54) SECURE VIRTUALIZATION SYSTEM SOFTWARE

(75) Inventors: Helmuth Freericks, Palm Beach Gardens, FL (US); Oleg Kouznetsov, Tequesta, FL (US)

(73) Assignee: Wontok, Inc., Palm Beach Gardens, FL (US)

( * ) Notice: Subject to any disclaimer, the term of this patent is extended or adjusted under 35 U.S.C. 154(b) by 1571 days.

(21) Appl. No.: 12/468,341

(22) Filed: May 19, 2009

(65) Prior Publication Data

US 2009/0288167 A1 Nov. 19, 2009

Related U.S. Application Data

(60) Provisional application No. 61/054,321, filed on May 19, 2008.

(51) Int. Cl.
*G06F 12/14* (2006.01)
*G06F 21/56* (2013.01)
*G06F 21/54* (2013.01)
(Continued)

(52) U.S. Cl.
CPC .............. *G06F 21/566* (2013.01); *G06F 21/54* (2013.01); *G06F 21/554* (2013.01); *G06F 21/62* (2013.01); *G06F 2221/2141* (2013.01); *G06F 2221/2149* (2013.01)

(58) Field of Classification Search
CPC ............ H04L 63/1416; H04L 63/1408; H04L 63/1441; H04L 63/0218
USPC .......................................................... 726/23
See application file for complete search history.

(56) References Cited

U.S. PATENT DOCUMENTS

| 5,148,544 A | 9/1992 | Cutler et al. |
| 5,740,413 A | 4/1998 | Alpert et al. |
| 6,131,163 A | 10/2000 | Wiegel |

(Continued)

FOREIGN PATENT DOCUMENTS

WO WO-03058451 A1 7/2003

OTHER PUBLICATIONS

International Preliminary Report on Patentability; Application Serial No. PCT/US2009/044505; filed May 19, 2009.

(Continued)

*Primary Examiner* — Tamara T Kyle
(74) *Attorney, Agent, or Firm* — Robert J. Sacco; Carol E. Thorstad-Forsyth; Fox Rothschild LLP

(57) ABSTRACT

Systems and methods for protecting a virtualization environment against malware. The methods involve intercepting an event in a kernel mode of the virtualization environment, suspending execution of the event, and transmitting the event to a user mode security module that determines whether the event should be blocked, allowed, or redirected. Events may be intercepted from any level of the virtualization environment, including an interrupt request table, device driver, OS object manager, OS service dispatch table, Portable Execution (P/E) import/export table, or binary code, among others. In one embodiment, an event may trigger a chain of related events, such that interception of an event without first intercepting an expected antecedent event is one indication of malware. The method also involves securing a virtual storage device against unauthorized access and providing for secure communication between guest OS and virtualization environment security modules.

16 Claims, 8 Drawing Sheets

(51) Int. Cl.
*G06F 21/55* (2013.01)
*G06F 21/62* (2013.01)

(56) References Cited

U.S. PATENT DOCUMENTS

| | | | |
|---|---|---|---|
| 6,205,492 B1 | 3/2001 | Shaw et al. | |
| 6,871,350 B2 | 3/2005 | Wong et al. | |
| 6,983,452 B1 | 1/2006 | Willems | |
| 7,000,100 B2 | 2/2006 | Lacombe et al. | |
| 7,007,157 B2 | 2/2006 | Morris et al. | |
| 7,024,672 B2 | 4/2006 | Callender et al. | |
| 7,085,928 B1 | 8/2006 | Schmid et al. | |
| 7,107,497 B2 | 9/2006 | McGuire et al. | |
| 7,181,382 B2 | 2/2007 | Shier et al. | |
| 7,363,657 B2 | 4/2008 | Caccavale | |
| 7,398,389 B2 | 7/2008 | Teal et al. | |
| 7,437,759 B1 | 10/2008 | Szor | |
| 7,472,272 B2 | 12/2008 | Stamos et al. | |
| 7,530,093 B2 | 5/2009 | Samuelsson et al. | |
| 7,577,765 B2 | 8/2009 | Bhesania et al. | |
| 7,702,906 B1 * | 4/2010 | Karr et al. | 713/164 |
| 7,765,558 B2 | 7/2010 | Kouznetsov et al. | |
| 8,051,482 B2 * | 11/2011 | Harrison | G06F 21/51 726/23 |
| 8,424,075 B1 * | 4/2013 | Walsh | H04L 63/0263 726/11 |
| 8,613,084 B2 * | 12/2013 | Dalcher | G06F 21/554 726/22 |
| 2002/0152331 A1 | 10/2002 | Wong et al. | |
| 2003/0081601 A1 | 5/2003 | Morris et al. | |
| 2003/0101381 A1 | 5/2003 | Mateev et al. | |
| 2003/0120935 A1 | 6/2003 | Teal et al. | |
| 2003/0159070 A1 | 8/2003 | Mayer et al. | |
| 2004/0003137 A1 | 1/2004 | Callender et al. | |
| 2004/0098639 A1 | 5/2004 | Liu | |
| 2004/0133801 A1 | 7/2004 | Pastorelli et al. | |
| 2004/0216145 A1 | 10/2004 | Wong et al. | |
| 2004/0243783 A1 | 12/2004 | Ding et al. | |
| 2005/0246522 A1 | 11/2005 | Samuelsson et al. | |
| 2005/0246564 A1 | 11/2005 | Bhesania et al. | |
| 2006/0074618 A1 * | 4/2006 | Miller et al. | 703/13 |
| 2007/0010435 A1 | 1/2007 | Frangione et al. | |
| 2007/0101435 A1 | 5/2007 | Konanka et al. | |
| 2008/0005794 A1 * | 1/2008 | Inoue et al. | 726/22 |
| 2008/0016314 A1 * | 1/2008 | Li et al. | 711/200 |
| 2008/0016339 A1 * | 1/2008 | Shukla | 713/164 |
| 2008/0034429 A1 | 2/2008 | Schneider | |
| 2008/0092145 A1 * | 4/2008 | Sun et al. | 719/312 |
| 2008/0263658 A1 * | 10/2008 | Michael et al. | 726/22 |
| 2009/0125902 A1 * | 5/2009 | Ghosh et al. | 718/1 |
| 2009/0288167 A1 | 11/2009 | Freericks et al. | |
| 2010/0138843 A1 | 6/2010 | Freericks et al. | |
| 2010/0251368 A1 | 9/2010 | Kouznetsov et al. | |

OTHER PUBLICATIONS

Information about Related Patents and Patent Applications, see section 6 of the accompanying Information Disclosure Statement Letter, which concerns related Patents and Patent Applications. Jul. 19, 2012.

* cited by examiner

SECURE VIRTUALIZATION SYSTEM SOFTWARE

CROSS REFERENCE TO RELATED APPLICATIONS

This non-provisional U.S. Patent Application claims the benefit of U.S. Provisional Patent Application No. 61/054,321 entitled "SYSTEM AND METHOD FOR PROVIDING A SECURE ENVIRONMENT FOR SOFTWARE VIRTUALIZATION SYSTEMS" filed on May 19, 2008 by inventors Helmuth Freericks and Oleg Kouznetsov.

BACKGROUND OF THE INVENTION

1. Statement of the Technical Field

The present invention relates to computing systems. More particularly, the present invention relates to systems and methods for providing secure virtualization system software.

2. Description of the Related Art

Virtualization software is transforming the way many companies provision and manage their computer systems and applications. Server and workstation virtualization software enables multiple operating systems and applications to execute on a single physical platform by sharing hardware resources. A virtualization environment, also known as a host operating system, master control system, or hypervisor, creates at least one virtual machine upon which a virtualized operating system (or "guest operating system") executes. The virtualization environment manages resources including, but are not limited to, processing units, storage devices, graphics devices, and the like. The virtualized operating system is executed on a virtual machine through the use of hardware abstraction provided by the virtualization environment.

Despite the advantages of virtualization technology, there are certain drawbacks. For example, the virtualization environment does not protect data accessed, updated and transferred in a virtual machine against hackers and malware. The phrase "malware", as used herein, refers to software executing on a user device that performs operations solely to the benefit of an unauthorized third party or otherwise harmful to the user device. The virtualization environment also does not protect virtualized operating systems against hackers and malware.

As such, there is a need for systems and methods for protecting data accessed, updated and transferred in a virtualization environment. There is also a need for systems and methods for protecting virtualized operating systems against hackers and malware.

SUMMARY OF THE INVENTION

This summary is provided to comply with the requirements in 37 C.F.R. §1.73, for presenting a summary of the invention briefly indicating the nature and substance of the invention. It is submitted with the understanding that it will not be used to interpret or limit the scope or meaning of the claims.

The invention concerns systems and methods for protecting a virtualization environment against malware. The methods involve intercepting an event in a kernel mode of the virtualization environment, suspending execution of the event, and transmitting the event to a user mode security module that determines whether the event should be blocked, allowed, or redirected. Events may be intercepted from any level of the virtualization environment, including an interrupt request table, device driver, OS object manager, OS service dispatch table, Portable Execution (P/E) import/export table, or binary code, among others. In one embodiment, an event may trigger a chain of related events, such that interception of an event without first intercepting an expected antecedent event is one indication of malware. The method also involves securing a virtual storage device against unauthorized access, and providing for secure communication between guest OS and virtualization environment security modules.

According to one aspect of the invention, a virtualization environment is protected against tampering by securely monitoring events with a System Monitor Toolkit (SMT) client. The SMT client may be a user mode application in communication with one or more SMT providers. In one embodiment, an SMT client manager operates with an SMT provider manager to manage communication between multiple SMT clients and multiple SMT providers. In one embodiment, SMT providers are kernel mode modules that hook into event sources throughout the hypervisor, typically at the request of an SMT client. Different SMT providers may hook into different hardware devices at different levels of the virtualization environment. Once an event is detected, an SMT provider may intercept and suspend the event. The SMT provider may then transmit the suspended event through the SMT provider manager and the SMT client manager to one or more SMT clients for processing, although the transmission may or may not include the SMT provider manager and/or the SMT client manager. In one embodiment, an SMT client provides a security analysis, determining whether to bock, allow, or redirect the event.

In one embodiment, the SMT client determines whether the intercepted event constitutes a malware attack on the virtualization environment, in which case the event is typically blocked. To block an event, the SMT client may send an indication through the SMT client manager and the SMT provider manager to the SMT provider that intercepted the event, instructing the SMT provider to block the event from execution. Similarly, when the SMT client determines the event is not malicious, the SMT client typically instructs the intercepting SMT provider to resume execution of the suspended event. However, it is also considered that a non-intercepting SMT provider may block or resume the suspended event. When the SMT client determines the event is to be redirected, another module may be invoked to perform processing on the event before the event is blocked or allowed to continue. One example of redirection is to encrypt or decrypt data written to a storage device such as a hard disk drive.

Additionally or alternatively, an SMT client may receive an intercepted event from an SMT provider, and based on the type of event, perform some action in addition to or instead of blocking/allowing/redirecting the event. In one embodiment, the SMT client may deliver the event to the event's target, thereby redirecting the event from the virtualization environment directly to the event's target over a secure path.

SMT providers may be installed at various levels of the virtualization environment, enabling fine grained and low level event monitoring and analysis. For instance, SMT providers may be installed in the IRQ table of the virtualization environment, or at one or more levels within a device driver (either a hardware device driver, a kernel mode device driver, a filter driver, or the like). Additionally or alternatively, a high level monitoring and analysis also may be achieved by installing one or more SMT providers at higher levels in the virtualization environment, such as an OS executive layer. By allowing access to events at virtually all levels of the virtualization environment, an SMT client executing in user mode may be given a virtually complete picture of events, as well as control over these events, as they are being processed in the virtualization environment.

For instance, a user mode anti-virus software program may perform a security analysis, typically without executing kernel mode functions, utilizing virtually complete information and control of kernel mode events. This technique avoids the unique challenges of writing kernel level code such as kernel mode memory management, thereby expanding the number of potential developers capable of developing software applications that benefit from the knowledge of and/or control of kernel mode events. Also, this technique enables development of richer applications by enabling developers to use the vast array of third party libraries and technologies available for user mode code. The following are examples of the typical software applications that may use the techniques described within this application: anti-spyware, anti-virus, on-the-fly encryption of data, firewall, and any other process, network, file, or registry related software functions.

According to another aspect of the invention, the SMT client manager may distribute a single event to more than one SMT client, each client having the ability to modify and/or allow/block/redirect the event. For example, one SMT client may intercept storage device access events for the purpose of securing the virtualization environment. A second SMT client may also intercept storage device access events for the purpose of collecting and aggregating system data. The SMT client manager facilitates securely passing a single event to multiple SMT clients.

According to another aspect of the invention, the SMT client may install a persistent security system that protects the virtualization environment after a restart or reboot. Persistent security benefits the overall security of the system because user mode applications, such as an SMT client, generally start later in the boot process than the kernel mode SMT provider manager and SMT providers. Without persistent security, waiting for the user mode SMT client to initialize the security system may leave a potential window of vulnerability to malware. In one embodiment, installing a persistent security system includes storing a security policy on a shared database. Then, upon restarting the virtualization environment and the initialization of the SMT provider manager and/or SMT provider, the SMT provider manager and/or SMT provider may read these policies and implement the security features on behalf of the SMT client.

According to another aspect of the invention, the SMT client and/or SMT provider may detect code that has been injected into the virtualization environment by scanning all of addressable memory for memory that is inaccessible. Inaccessible memory may then be traced to an image on disk, and analyzed for indications of malware. In one instance, when the image on disk is digitally signed, the image is presumed to not be malware, whereas an image that is not digitally signed may be suspected of being malware.

In one embodiment, the SMT client may verify the security of an intercepted event. For example, the SMT client may determine the source of the event based on: information in the event, a stack walk, or by inspecting the owner of associated virtualization environment objects such as threads, processes, semaphores, and the like. The source of the event may include an in memory image. The SMT client may locate an image stored on a storage device that is associated with the in memory image. If image stored on the storage device contains a digital signature or other indication of non-malware, the SMT client may determine that resuming the intercepted event is secure. If the image stored on the storage device is determined to be malware, the SMT client may block execution of the intercepted event.

According to another aspect of the invention, events in the virtualization environment may occur in one or more expected sequences. In this aspect, the SMT client may request that one or more SMT providers intercept and redirect multiple events in the same expected sequence. By monitoring events in an expected sequence—typically generated at multiple levels in the virtualization environment—the SMT client may be able to determine when an event is expected and therefore secure. Likewise, if the SMT client receives an event that is unexpected, and therefore potentially malware, the SMT client may block executing of the event.

According to another aspect of the invention, the SMT client may be authenticated against a digital certificate. Additionally or alternatively, the in-memory image of the SMT client may be compared against an on-disk image of the SMT client, where any differences may indicate the SMT has been patched in memory. If an SMT client does not match a digital certificate, or has been patched in memory, the SMT client may be terminated.

According to another aspect of the invention, A virtualized storage device image is protected from unauthorized access, updates, or transfers to another medium. One example virtualized storage device image is a virtualized hard drive image containing a guest OS and associated data. Traditional security systems, including traditional anti-virus programs, may be unaware that they are executing on a virtual machine. On a virtual machine, the "hard drive" may appear to the guest OS and any other applications as a real, physical hard drive, but is in fact a virtual hard drive provided by the virtualization environment. This additional layer of virtualization provides a potential vulnerability, as malware may attempt to modify data in a virtual hard drive while outside the control of the guest OS. For instance, malware may attempt to monitor guest OS hard drive traffic while data is transferred from the virtual hard drive driver to the virtualization environment, as data is transferred from the virtualization environment to the real hard driver device driver, and/or as data is transferred from the real hard drive device driver to the physical hard drive, among others. In one embodiment, SMT providers are hooked into these events. In this way, the SMT provider displaces and prevents any other attempts to hook into the system.

Malware may also attempt to read, write, and/or modify data stored on the virtual hard drive by accessing the physical hard drive directly. In one embodiment, SMT providers intercept functions and events that may be used by malware to read, write, and/or modify the contents of the virtual hard drive. Upon detecting that a hard drive access event is attempting to modify the virtualized hard driver, and the event does not originate from the virtual hard drive drivers of the guest OS, the hard drive access event is typically blocked.

In one embodiment, data stored to the virtual hard drive may be automatically encrypted, independent of any encryption operation performed by the guest OS or any application running thereon. Automatic encryption of data stored in the virtual hard drive further enhances security of the virtualization system. Similarly, an SMT provider and SMT client may redirect an event that reads encrypted data from the virtual hard drive to a decryption module, thereby enabling seamless encryption and decryption for the guest OS.

According to another aspect of the invention, security of the virtualization system is enhanced by facilitating communication between an SMT client in the virtualization environment and a security component executing on one or more guest OSs. In one embodiment, a guest OS may also be executing a system of SMT clients, SMT client managers, SMT provider managers, and SMT providers, to protect the guest OS from malware. In this case, there may be events intercepted on the guest OS that are unexpected or otherwise deemed to be malicious. In addition to the option of blocking these malicious events, the guest OS SMT client may communicate the existence and nature of the event to a virtualization environment SMT client. The virtualization environment SMT client, through a more complete view of the computing system, may seek to understand the cause of the event, inform SMT clients executing on other guest OSs of a potential vulnerability, and/or terminate the guest OS.

Embodiments of the present invention also concern computer systems implementing the above described methods. The computer systems include a computer readable medium having instructions stored thereon and a processing device communicatively coupled to the computer readable medium. The processing device is configured for executing the instructions that cause the computer system to execute the trusted secure desktop simultaneously with an unsecure desktop, execute the first end user application on the trusted secure desktop, and performing one or more security service operations to protect the first end user application against malware.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures, wherein like reference numbers are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Illustrative Operating Environment

Figure 1:
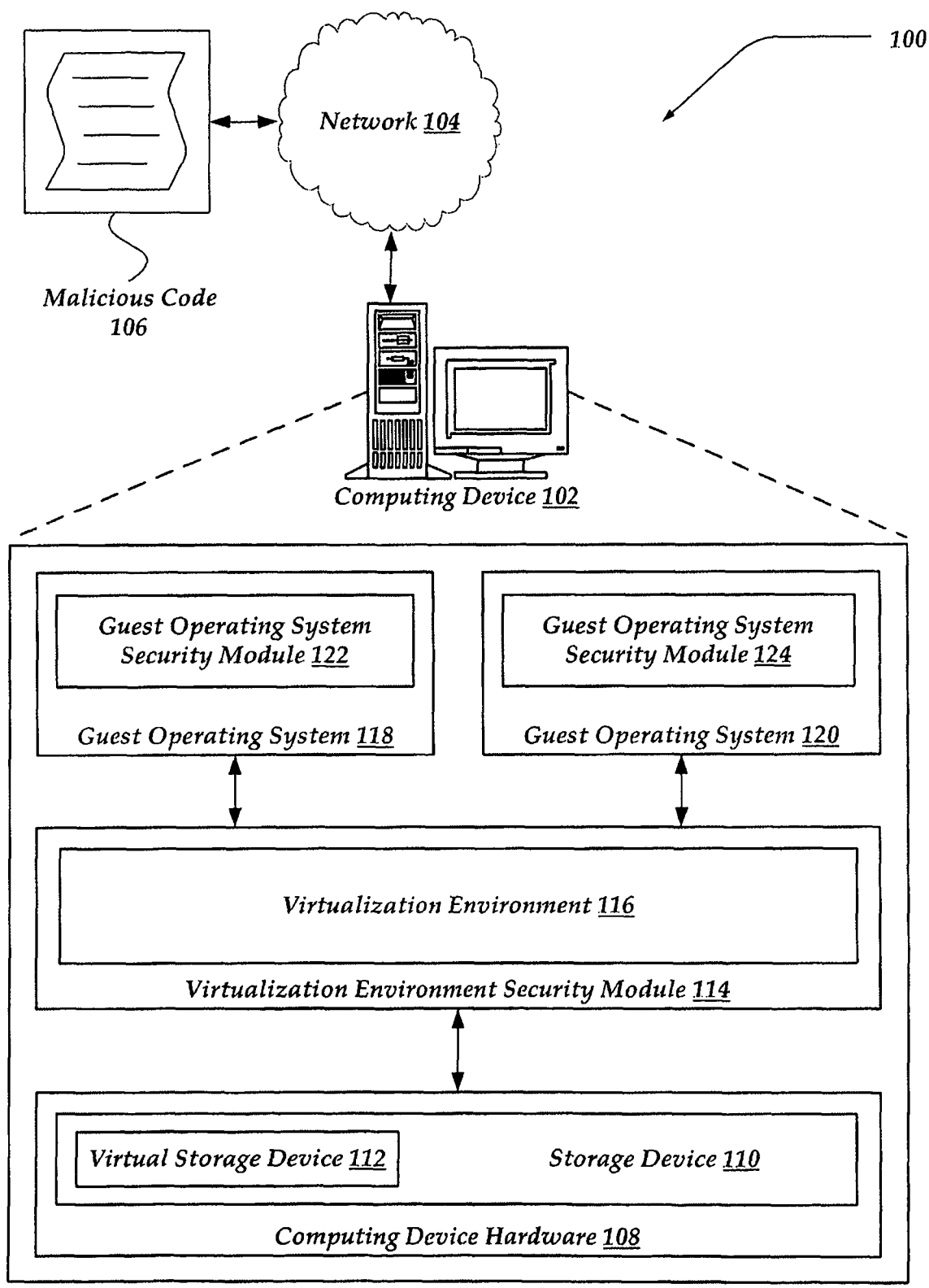
FIG. 1 is a schematic illustration of a virtualization system according to an embodiment of the present invention.

FIG. 1 shows a schematic illustration of a virtualization system according to an embodiment of the present invention. System 100 of FIG. 1 may include more or less components than are illustrated. However, the components shown are sufficient to disclose an illustrative embodiment using a virtualization environment security module. As shown, system 100 may represent one embodiment of a representative computing device simultaneously executing multiple operating systems.

As shown in the figure, system 100 includes computing device 102, network 104, and malicious code (or malware) 106. Computing device 102 further includes computing device hardware 108, including storage device 110 which contains virtual storage device 112. Computing device 102 further includes virtualization environment security module 114 for protecting virtualization environment 116. Virtualization environment 116 multiplexes, or virtualizes, the computing device hardware 108, enabling multiple guest operating systems, such as guest operating system 118 and guest operating system 120, to execute in parallel on a single physical computer. Further, guest operating system 118 and 120 may be protected by guest operating system security module 122 and guest operating system security module 124, respectively.

Generally, computing device 102 may include virtually any computing device. In one embodiment, computing device 102 may include a server computer, workstation computer, personal computer, multiprocessor system, microprocessor-based or programmable consumer electronic, network device, and the like. As such, computing device 102 may range widely in terms of capabilities and features. For example, a computing device may be configured to execute high throughput applications in a commercial web server, or a computing device may be a home computer for running desktop applications.

Network 104 is configured to couple one computing device with another computing device. Network 104 may be enabled to employ any form of computer readable media for communicating information from one electronic device to another. Also, network 104 can include the Internet in addition to local area networks (LANs), wide area networks (WANs), direct connections, such as through a universal serial bus (USB) port, other forms of computer-based media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Computing device 102 may request and/or receive data, video, applications, or the like over the network 104. Computing device may also be exposed to malicious code 106 via network 104. Malicious code may attempt to gain access to the computing device 102 in a variety of ways, including a Trojan horse, cross site scripting vulnerability, or remote exploit. Malicious code 106 may be introduced to the computing device 102 by means other than the network 104. For example, physical media, such as a compact disc, DVD-ROM, flash memory drive, removable hard driver, may act as a vector to introduce malicious code 106 to the computing device 102.

Figure 2:
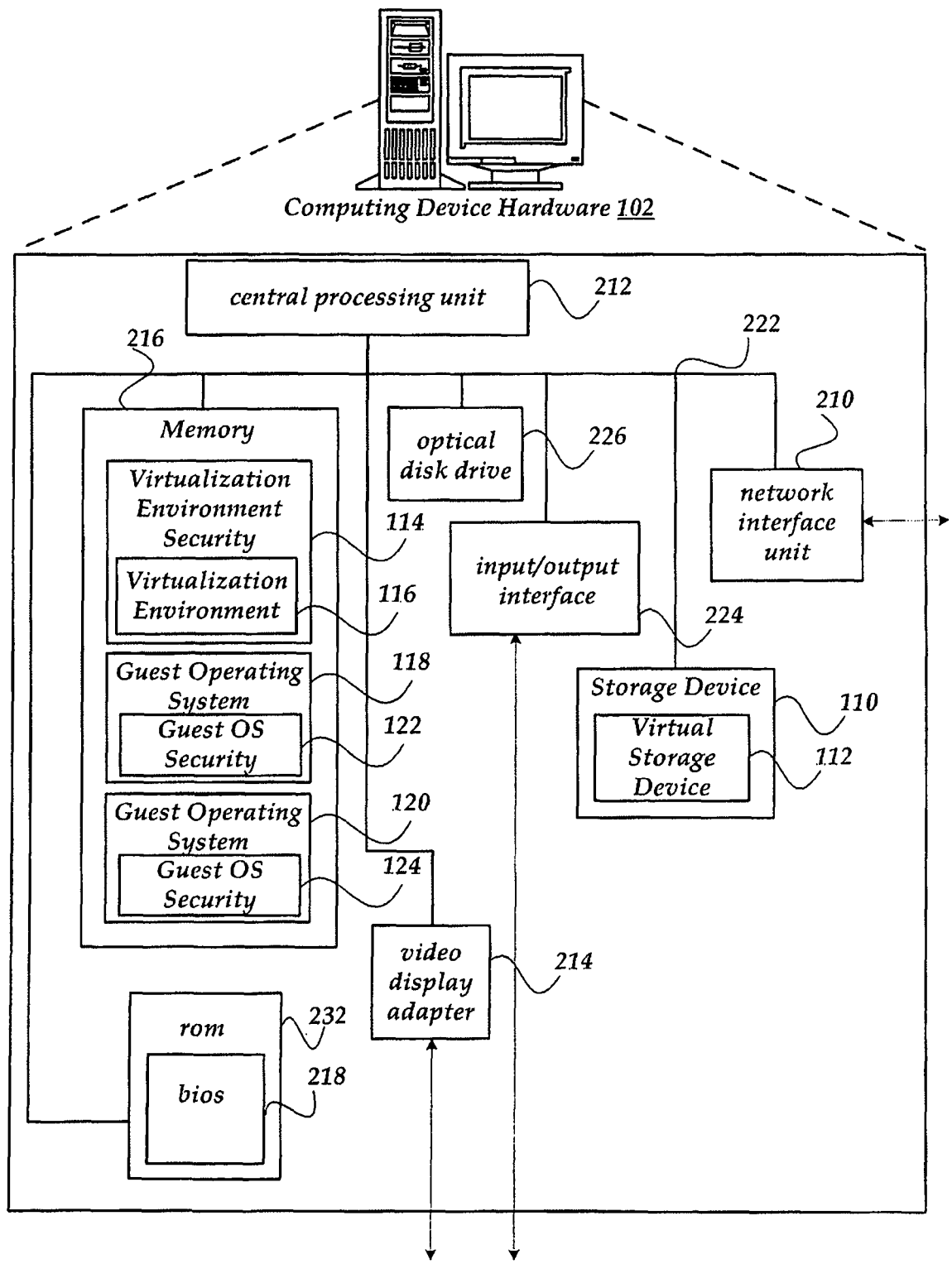
FIG. 2 is a schematic illustration of an exemplary computing device configured according to an embodiment of the present invention.

Computing device hardware 108 generally includes the tangible components of computing device 102, and are described in greater detail with relation to FIG. 2. Storage device 110 may include a hard drive, flash memory drive, removable media such as a CD-ROM or DVD-ROM drive, among others. In a non-virtualized environment, an operating system controls physical hardware devices, such as storage device 110, directly. In a virtualized environment, however, each guest operating system typically requires a separate virtual storage device, such as virtual storage device 112. Guest operating system 122, for instance, may be presented with virtual storage device 112 as if virtual storage device 112 were a physical hard drive. In fact, guest operating system 122 shares storage device 110 with other guest operating systems, as well as the virtualization environment 116. Given this shared access, malware installed in the virtualization environment may attempt to access or modify data stored on virtual storage device 112 through storage device 110. Typically, access is not granted by the virtualization environment security module 114

Virtualization environment 116, also known as a host operating system, hypervisor, master control system, or the like, controls the computing device hardware 108, and exposes the available hardware resources to one or more guest operating systems, so that it appears to each guest operating system that it is running on a dedicated computing device. The virtualization environment 116 may completely emulate a computing device, such that a guest operating system typically would not directly access the physical computing device hardware 108. In another embodiment, the virtualization environment 116 may embody a "bare metal" hypervisor, providing a thin virtualization layer that enables a greater amount of direct hardware access by guest operating systems, and a minimum of indirection and emulation. Also, the virtualization environment 116 may embody a stand-alone operating system that has been modified to enable virtualization of hardware resources, or the virtualization environment may embody a hypervisor that primarily virtualizes hardware resources, but is not itself a traditional operating system.

Virtualization environment security module 114 enhances the security of the virtualization environment 116 and the guest operating systems 118 and 120. In one embodiment, the virtualization environment security module 114 intercepts kernel and user mode events received in or originating in the virtualization environment 116. These intercepted events may be suspended and evaluated for evidence of malware or other malicious code. In one embodiment, kernel and user mode events are exposed through an API to the user mode of the virtualization environment 116, enabling a wide range of security software to access a fine grained, low level of access to the intercepted events. Event interception, suspension, and security analysis is discussed in more detail with respect to FIG. 4.

In another embodiment, the virtualization environment security module 114 secures access to the virtual storage device 112, preventing malware from monitoring or modifying data as it is copied from a guest operating system to the virtual storage device. Alternatively or additionally, the virtualization environment security module 114 denies access to data stored on the virtual storage device 112 by limiting access to the corresponding guest operating system. Protection of the virtual storage device 112 is discussed in more detail with respect to FIG. 5.

In another embodiment, the virtualization environment security module 114 enhances security by communicating security information between itself and the guest operating system security modules 122 and 124. In one embodiment, guest operating system security modules 122 and 124 employ methods to identify malware executing in the guest operating systems 118 and 120, respectively. Once malware or potential malware has been identified, the guest operating system security modules 122 and 124 may communicate the existence or potential existence of malware to the virtualization environment security module 114. Upon receiving this communication, the virtualization environment security module 114 may alert other guest operating system security modules of the presence of malware in another guest OS, attempt to discover the source of the malware, or terminate the guest OS executing the malware. Enhancing security by enabling communication between security modules in the virtualization environment and guest operating systems is discussed in more detail with respect to FIG. 6.

FIG. 2 shows one embodiment of a computing device, according to one embodiment of the invention. Computing device 102 may include many more or less components than those shown. The components shown, however, are sufficient to disclose an illustrative embodiment for practicing one or more embodiments of the invention.

Computing device 102 includes at least one central processing unit (CPU) 212, video display adapter 214, and a mass memory, all in communication with each other via bus 222. The mass memory generally includes memory (RAM) 216, ROM 232, and one or more permanent mass storage devices, such as storage device 110, hard drive, tape drive, optical drive, and/or floppy disk drive. The mass memory stores virtualization environment 116 for controlling, in combination with guest OS 118 and guest OS 120, the operation of computing device 102.

As illustrated in FIG. 2, computing device 102 also can communicate with the Internet, or some other communications network via network interface unit 210, which is constructed for use with various communication protocols including the IP protocol. Network interface unit 210 is sometimes known as a transceiver, transceiving device, or network interface card (NIC).

The mass memory 216, 226, 110, and 232 described herein and shown in FIG. 2 illustrates another type of computer-readable media, namely computer readable, machine readable storage media, or processor readable storage media.

Computer readable storage media may include volatile, non-volatile, removable, and non-removable media implemented in any method or technology for storage of information, such as computer readable instructions, or machine-readable instructions, data structures, program modules, or other data, which may be obtained and/or executed by at least one central processing unit 212 to perform one or more portions of the processes described below in more detail in conjunction with FIGS. 1 and 3-9. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer executable instructions, and which can be accessed by a computing device.

The mass memory may also store other types of program code and data such as virtualization environment security module 114, which may be loaded into mass memory and run on virtualization environment 116. The mass memory may also store guest operating system security modules 122 and 124, which may be loaded into mass memory and run on guest operating systems 118 and 120, respectively. Examples of virtualization environment security module 114 includes VirtProt® by Authenitum® corporation. Each of the virtualization environment 116 and the guest operating systems 118 and 120 may also execute email client/server programs, routing programs, schedulers, web servers, calendars, database programs, word processing programs, HTTP programs, RTSP programs, additional security programs, and any other type of application program.

Computing device 102 may also include input/output interface 224 for communicating with external devices, such as a mouse, keyboard, scanner, or other input/output devices not shown in FIG. 2. Likewise, computing device 102 may further include additional mass storage facilities such as cd-rom/dvd-rom optical disk drive 326. Storage device 110 may be utilized to store virtual storage device 112, among other things, including application programs, databases, and the like in the same manner as the other mass memory components described above.

Figure 3:
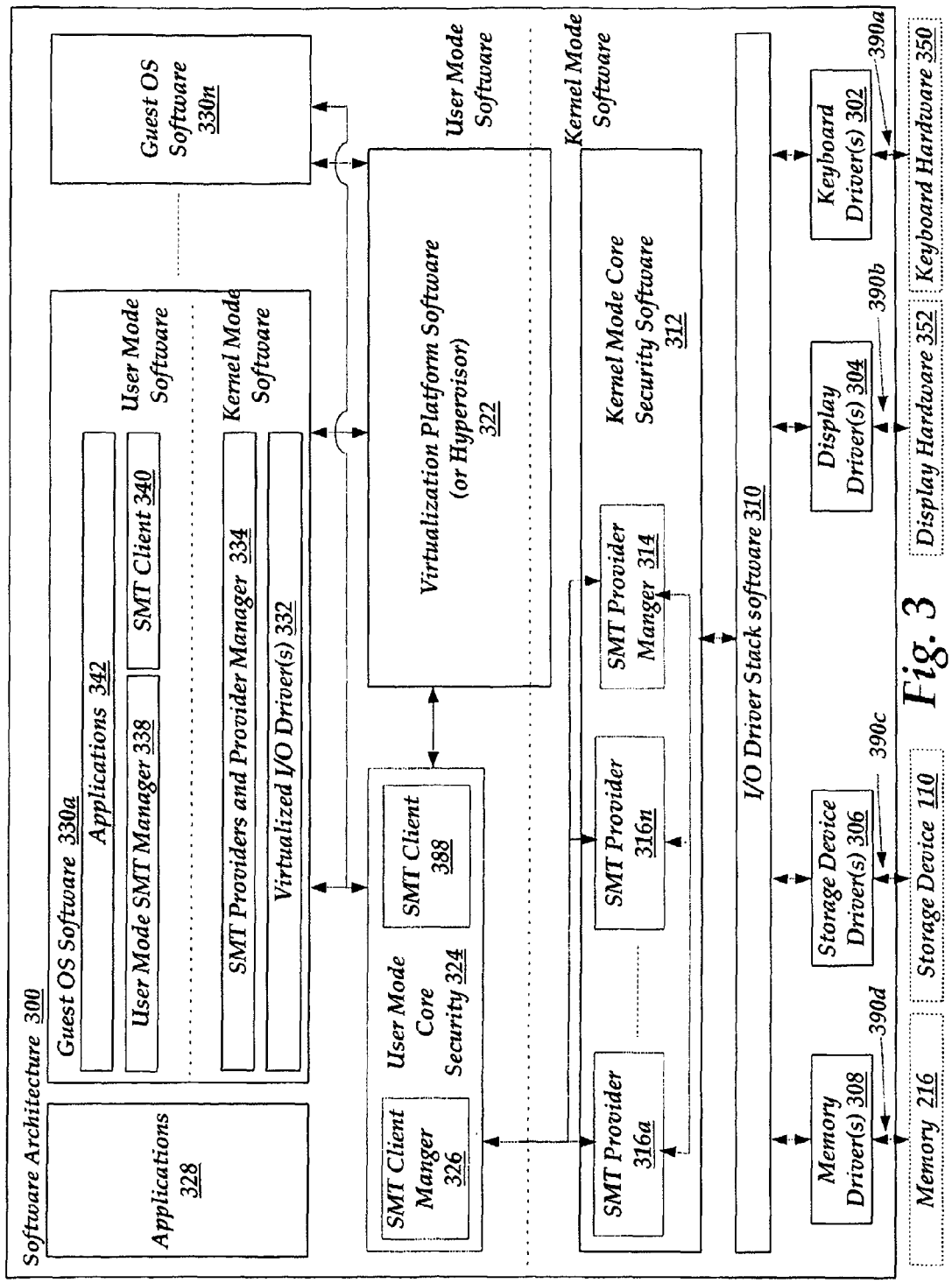
FIG. 3 is a schematic illustration of an exemplary software architecture for the computing device shown in FIG. 1.

Referring now to FIG. 3, there is provided an exemplary software architecture for the computing device 102, including the virtualization environment 116 and guest operating systems. As shown in FIG. 3, the software architecture can include levels of software programs. The software architecture includes device drivers 302, 304, 306, 308, an Input/Output (I/O) Driver Stack software 310, virtualization environment security module (not shown, but composed in part of kernel mode core security software 312 and user mode core security software 324), virtualization platform software 322, applications 328 and guest OS software 330, . . . , 330n. The software components 302, 304, 306, 308, 322, 328 of the software architecture are well known to persons having ordinary skill in the art. Thus, the software components 302, 304, 306, 308, 322, 328 will not be described in detail herein. However, a brief description of the software architecture is provided to assist a reader in understanding the present invention.

Each of the device drivers 302, 304, 306, 308 is software used to facilitate communications between the virtualization environment and hardware components (e.g., hardware components 110, 210, 214, 216, 224 and/or 226 described above in relation to FIG. 2). The device drivers 302, 304, 306, 308 can include code for managing access to hardware components, setting hardware component parameters and transmitting data between hardware components.

The keyboard filter driver 302 is a device driver software program that the virtualization environment uses to facilitate communications between keyboard hardware 350. The keyboard filter driver 320 connects to the keyboard hardware 350 via a respective connection 390a. The display driver 304 is a device driver software program that the virtualization environment uses to facilitate communications between display hardware 352. The display driver 304 connects to the display hardware 352 via a respective connection 390b. The storage device driver 306 is a device driver software program that the virtualization environment uses to facilitate communications between storage device 110. The storage device driver 306 connects to the storage device 110 via a respective connection 390c. The memory driver 308 is a device driver software program that the virtualization environment uses to facilitate communications between memory 216. The memory driver 308 connects to the memory 216 via a respective connection 390d. The device drivers 302, 304, 306, 308 facilitate communication between the virtualization environment and hardware devices via the I/O driver stack software 310 and the kernel mode core security software 312. The kernel mode core security software 312 generally protects the virtualization environment and applications 328, 322 against hackers and malware.

The virtualization environment is system software responsible for the direct control and management of the computing device 102 hardware (e.g., hardware components 110, 210, 214, 216, 224 and/or 226 described above in relation to FIG. 2). The virtualization environment may be a host OS, a hypervisor, or a master control system. Typically, the virtualization environment manages basic computing device 102 operations, such as loading and running software applications 328, 322. The virtualization environment is also system software responsible for enabling a user to control hardware coupled to the computing device 102. The virtualization environment can also include instructions to install, launch and manage applications 328 and 322. The virtualization environment is typically stored in memory (e.g., memory 216 described above in relation to FIG. 2) which may be a ROM, hard drive or other storage device.

As shown in FIG. 3, the software architecture includes core security software 312 and 324. The core security software 312, 324 include includes kernel mode core security software 312 and user mode core security software 324. The core security software 312 is generally operative to perform kernel mode event monitoring operations and kernel mode event interception operations. Similarly, the core security software 324 is generally operative to perform user event mode monitoring operations and user mode event interception operations. The core security software 312 includes System Monitor Toolkit (SMT) provider manager software 314 and SMT provider software 316a, . . . , 316n that executes in kernel mode. The core security software 324 includes SMT client manager software 326 that executes in user mode. The phrase "user mode", as used herein, refers to a state in which a process runs application code (e.g., end-user application code) rather than kernel code (e.g., device driver code and platform service code). The phrase "kernel mode", as used herein, refers to a state in which a process runs kernel code (e.g., device driver code, platform service code, and other kernel code that allows full access to the client computer 102 system).

The SMT providers 316a, . . . , 316n can generally be standalone software modules which execute in kernel mode while providing interception of specific kernel mode events.

Each of the SMT providers 316a, . . . , 316n respectively intercept kernel mode events that belong to the same or similar class. For example, the SMT provider software 316a is classified as File System SMT provider software that can intercept Network Input/Output (I/O) requests. Embodiments of the present invention are not limited in this regard. The SMT provider software 316a, . . . , 316n can include C Libraries of Binary Interception and Instrumentation (not shown) and C Run-Time Libraries (not shown). C Libraries of Binary Interception and Instrumentation (not shown) are well known to those having ordinary skill in the art, and therefore will not be described herein. Similarly, C Run-Time Libraries (not shown) are well known to those having ordinary skill in the art, and therefore will not be described herein.

The SMT provider manager software 314 is a driver or other software component that executes in kernel mode while performing registration operations for registration of the SMT provider software 316a, . . . , 316n and un-registration operations for un-registration of the SMT provider software 316a, . . . , 316n. The SMT provider manager software 314 supplies the SMT provider software 316a, . . . , 316n with a unified interface for intercepting kernel mode events, accessing a Common Information Model (CIM) library, accessing a CIM repository, delivering intercepted kernel mode events to SMT clients and other applications, and receiving processed data about the intercepted kernel mode events from the SMT clients and other applications. The phrase "Common Information Model", as used herein, refers to an object oriented information model that provides a conceptual framework for describing management data, as specified by the Distributed Management Task Force, Inc.'s (DMTF) Common Information Model (CIM) Standard. The DMTF CIM Standard is well known to those having ordinary skill in the art, and therefore will not be described herein.

The SMT client manager software 326 is a service or other software component that executes in user mode while managing various the applications 328. The SMT client manager software 326 communicates with the applications 328 via predefined protocols, such as Local Procedure Calls (LPCs), Remote Procedure Calls (RPCs), CPU hypervisor instruction manipulation, Transmission Control Protocols/Internet (TCP/IP) protocols, memory mapping, and file I/O. These protocols are well known to those having ordinary skill in the art, and therefore will not be described herein.

The applications 328 can directly interface the core security software 324 using an Application Programming Interface (API) using predefined protocols. The predefined protocols can include, but are not limited to, LPCs, RPCs, and TCP/IP protocols, memory mapping, file I/O, and CPU hypervisor instructions. APIs are well known to those having ordinary skill in the art, and therefore will not be described herein. The applications 328 can provide a variety of functionalities to the end-user, such as data input functions, spreadsheet functions and word processor functions. The phrase "end-user", as used herein, refers to a person or persons using a device the enables him or them to use the present invention. The applications 328 can be validated against a required digital signature before being allowed to interface with the core security software 324.

The virtualization platform software (or hypervisor) 322 is generally operative to communicate with the core security software 312, 324. The virtualization platform software (or hypervisor) 322 is also generally operative to allow multiple guest operating systems to concurrently run on the host computing device 100. In this regard, the virtualization platform software (or hypervisor) 322 is operative to intercept some, or all, guest operating system calls to hardware. The virtualization platform software (or hypervisor) 322 virtualizes at least one hardware component of the computing device 102. For example, the virtualization platform software (or hypervisor) 322 virtualizes the CPU 212 and the memory 216 shown in FIG. 2. Embodiments of the present invention are not limited in this regard. The virtualization platform software (or hypervisor) 322 is also operative to create, manage and destroy virtual machines, also known as partitions. The term "partition", as used herein, refers to an abstract container that consists of isolated processor and memory resources.

The guest operating system software components 330a, . . . , 330n run on top of virtual machines created by the virtualization platform software (or hypervisor) 322. The guest operating system software components 330a, . . . , 330n are protected from each other such that software errors on one virtual machine cannot affect the correct operation of any of the other virtual machines. Each of the guest operating system software components 330a, . . . , 330n includes virtualized I/O driver(s) 332, guest operating system security module (not shown, but including kernel mode core security software 334, user mode SMT manager 338, and SMT client 340) and applications 342. The software components 332 and 342 are well known to those having ordinary skill in the art, and therefore will not be described herein.

The kernel mode core security software 334 is the same as or substantially similar to the kernel mode core security software 312 described above. As such, the above description of the kernel mode core security software 312 is sufficient for understanding the kernel mode core security software 334. Similarly, the user mode SMT client manager 338 and SMT client 340 are the same as or substantially similar to the user mode core security software 324 described above. As such, the above description of the user mode core security software 324 is sufficient for understanding the user mode SMT client manager 338 and the SMT client 340. However, the SMT provider manager of the kernel mode security software 334 further supplies the SMT providers (not shown) with a unified interface for delivering intercepted kernel mode events in the guest OS 330a to the security software 338, and receiving processed data about the intercepted kernel mode events from the security software 338. Also, the SMT client manager 338 of the user mode security software is configured to communicate with the SMT client manager 326 running on the virtualization environment.

The user mode SMT client 340 is operative to use information provided by the guest OS in real-time while having the ability to employ a wide range of functionality. The wide range of functionality includes, but is not limited to, monitoring File I/O kernel mode requests, granting File I/O kernel mode requests, denying File I/O kernel mode requests, and accessing registries. If the guest OS is a Windows operating system, then the user mode SMT client 340 can be standard WIN32 or WIN64 applications. WIN32 and WIN64 applications are well known to those having ordinary skill in the art, and therefore will not be described herein. The SMT client 340 can directly interface the user mode core security software using an API using predefined protocols. The predefined protocols can include, but are not limited to, LPCs, RPCs, and TCP/IP protocols, memory mapping, file I/O, and CPU hypervisor instructions. The SMT client 340 can provide a range of functionalities to an end-user, such as data input functions, spreadsheet functions, and/or word processor functions. The SMT client 340 can be validated against a required digital signature before being allowed to interface with the user mode SMT manager 338.

Figure 4:
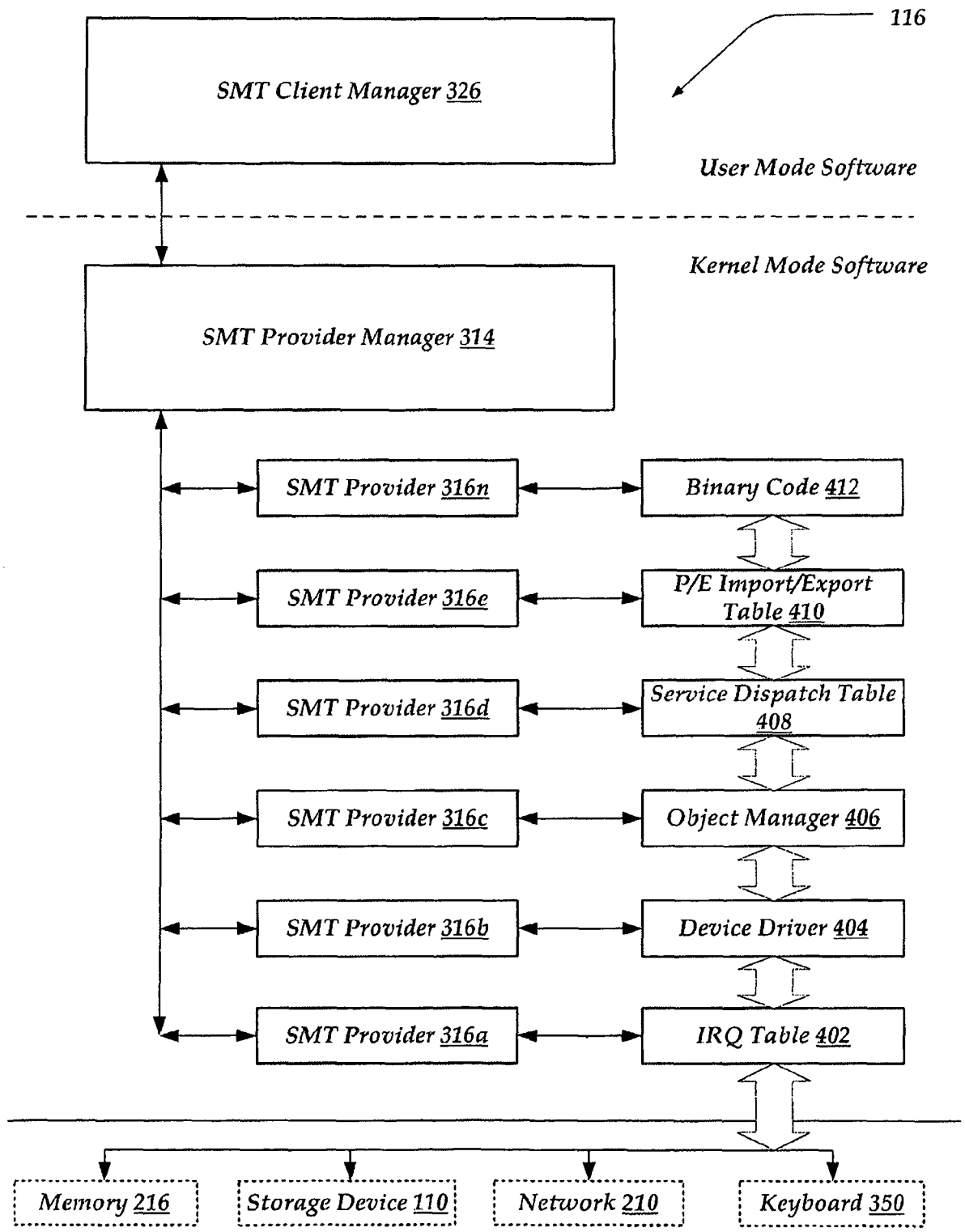
FIG. 4 is a schematic illustration of an exemplary software architecture for intercepting events, redirecting the events, and determining whether to process an event.

Referring now to FIG. 4, there is provided a more detailed example embodiment of virtualization environment 116. In one embodiment, events propagate from event sources, such as memory 216, storage device 110, network 210, and keyboard 350, and the like, through different levels of the virtualization environment. In one embodiment, an illustrative sequence of events is triggered in an Interrupt Request (IRQ) table 402, typically in response to some action being taken on a hardware device, although other sources of events such as software applications are similarly considered. The event may then be passed to a device driver 404, such as a Hardware Abstraction Layer (HAL) device driver, a kernel mode device driver, a filter driver, or the like. In one embodiment, multiple device drivers may process the event, or there may be multiple stages of execution within a single device driver such that the event may be intercepted at more than one point in the device driver 404. Additionally or alternatively, the event may be passed to an object manager 406, a service dispatch table 408, a Portable Executable (P/E) import or export table 410, and a binary code 412. As the sequence of events occurs, SMT providers 316a, . . . 316n may intercept and suspend execution of the event, passing the event through the SMT provider manager 314 to the SMT Client manager 326 and SMT clients (not shown) for processing.

In one embodiment, SMT providers 316a, . . . 316n and/or SMT provider manager 314 may block the execution of explicitly malicious events. For example, any event that attempts to inject code into the virtualization environment 116, such as by loading a library into a process, will be blocked. SMT providers 316a, . . . 316n may block code injection with or without the cooperation of an SMT client.

Figure 5:
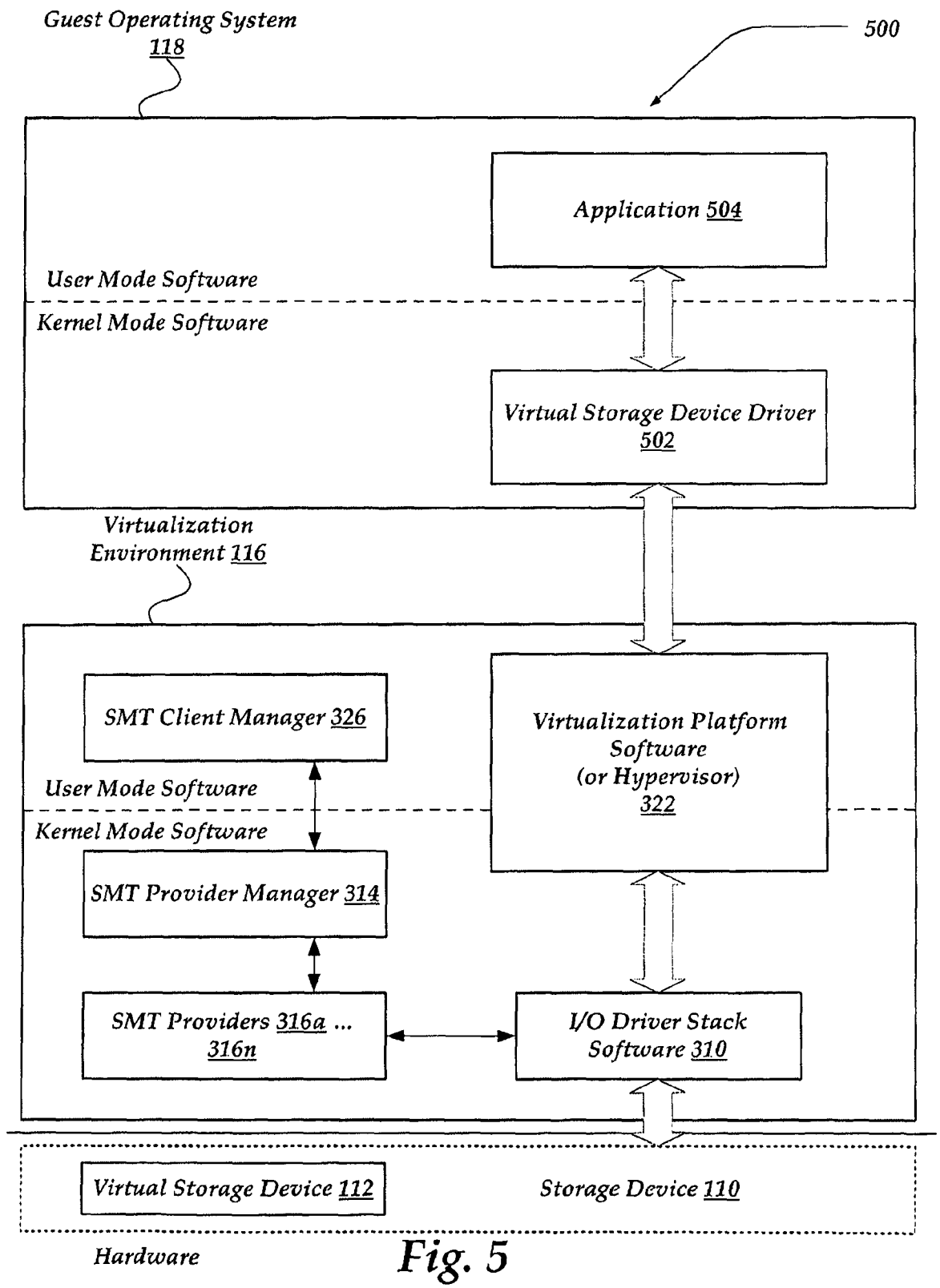
FIG. 5 is a schematic illustration of an exemplary software architecture for protecting a virtual storage device against malware.

Referring now to FIG. 5, there is provided a more detailed example embodiment 500 of protecting the virtual storage device 112 stored on the storage device 110. In one embodiment, SMT providers 316a, . . . 316n are hooked directly into the levels 402 . . . 412 of the I/O driver stack software 310. In this way, the SMT provider displaces and prevents any other attempts to hook into the system. The SMT providers 316a, . . . 316n communicate intercepted events through SMT provider manager 314 to SMT client manager to SMT clients (not shown) for processing as discussed above.

Malware may also attempt to read, write, and/or modify data stored on the virtual storage device 112 by accessing the physical storage device 110 directly. In one embodiment, SMT providers intercept functions and events that may be used by malware to read, write, and/or modify the contents of the virtual storage device 112. In one embodiment, access to the virtual storage device 112 is only allowed to the hypervisor 322 executing on behalf of a virtual storage device driver 502 and application 504.

Figure 6:
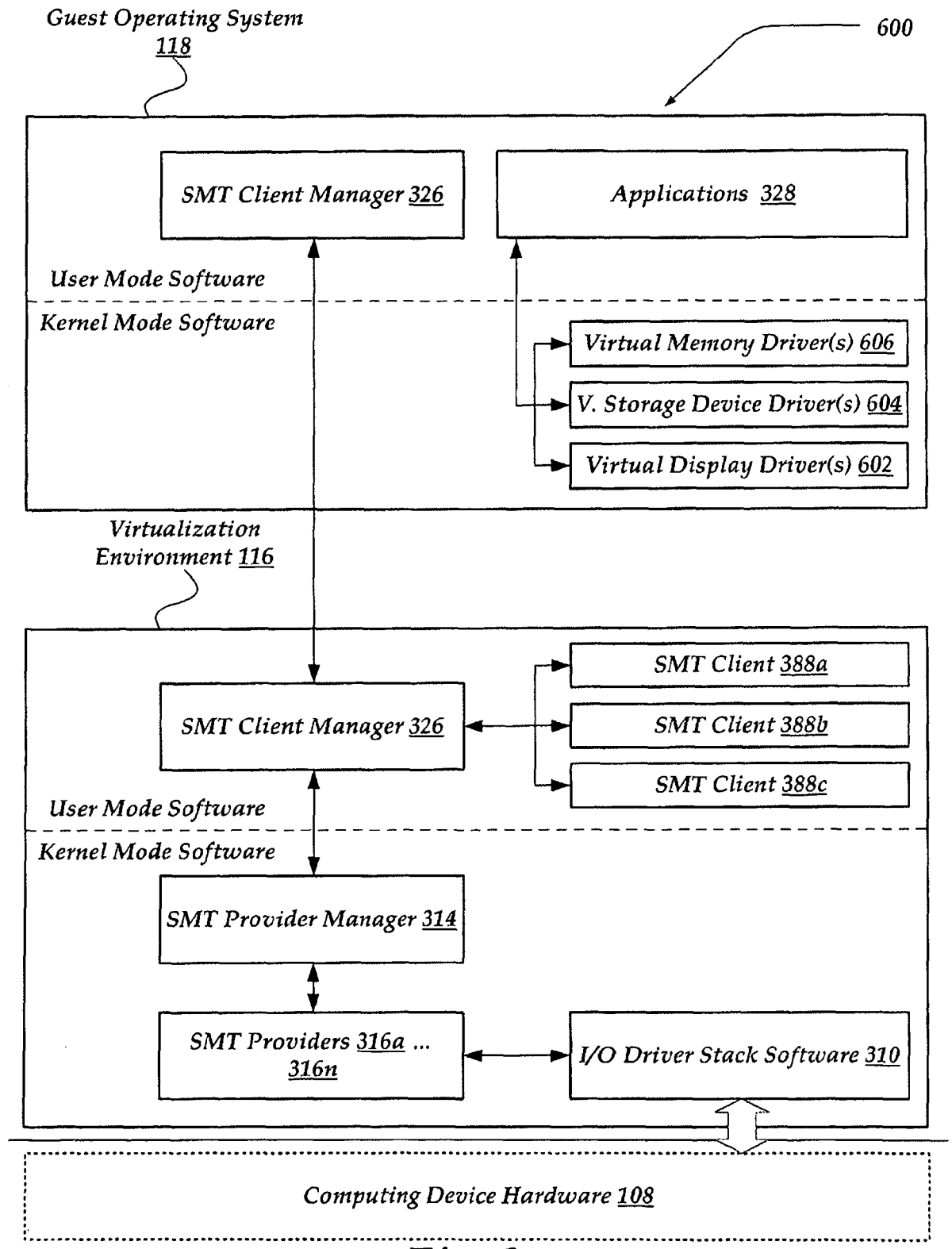
FIG. 6 is a schematic illustration of an exemplary software architecture for increasing security of a virtualization system by enabling secure communication between security modules in a virtualization environment and a guest OS.

Referring now to FIG. 6, According to another aspect 600 of the invention, security of the virtualization environment 116 is enhanced by facilitating communication between an SMT client 388a, . . . 388c on the virtualization environment 116 and a security component such as SMT client manager 326 and SMT clients (not shown) on guest OS 118. In one embodiment, applications 328 access hardware resources through virtual display driver 602, virtual storage device driver 604, and virtual memory driver 606. SMT providers/clients executing on the guest OS 118 may intercept events that are unexpected or otherwise deemed to be malicious. In addition to the option of blocking these malicious events, the guest OS SMT client manager 326 or SMT clients (not shown) may communicate the existence and nature of the malicious event to the SMT client manager 326. The SMT client manager 326 and SMT clients 388a, . . . 388c, through a more complete view of the computing system, may seek to understand the cause of the event, inform SMT clients executing on other guest OSs of a potential vulnerability, and/or terminate the guest OS.

Generalized Operation

Figure 7:
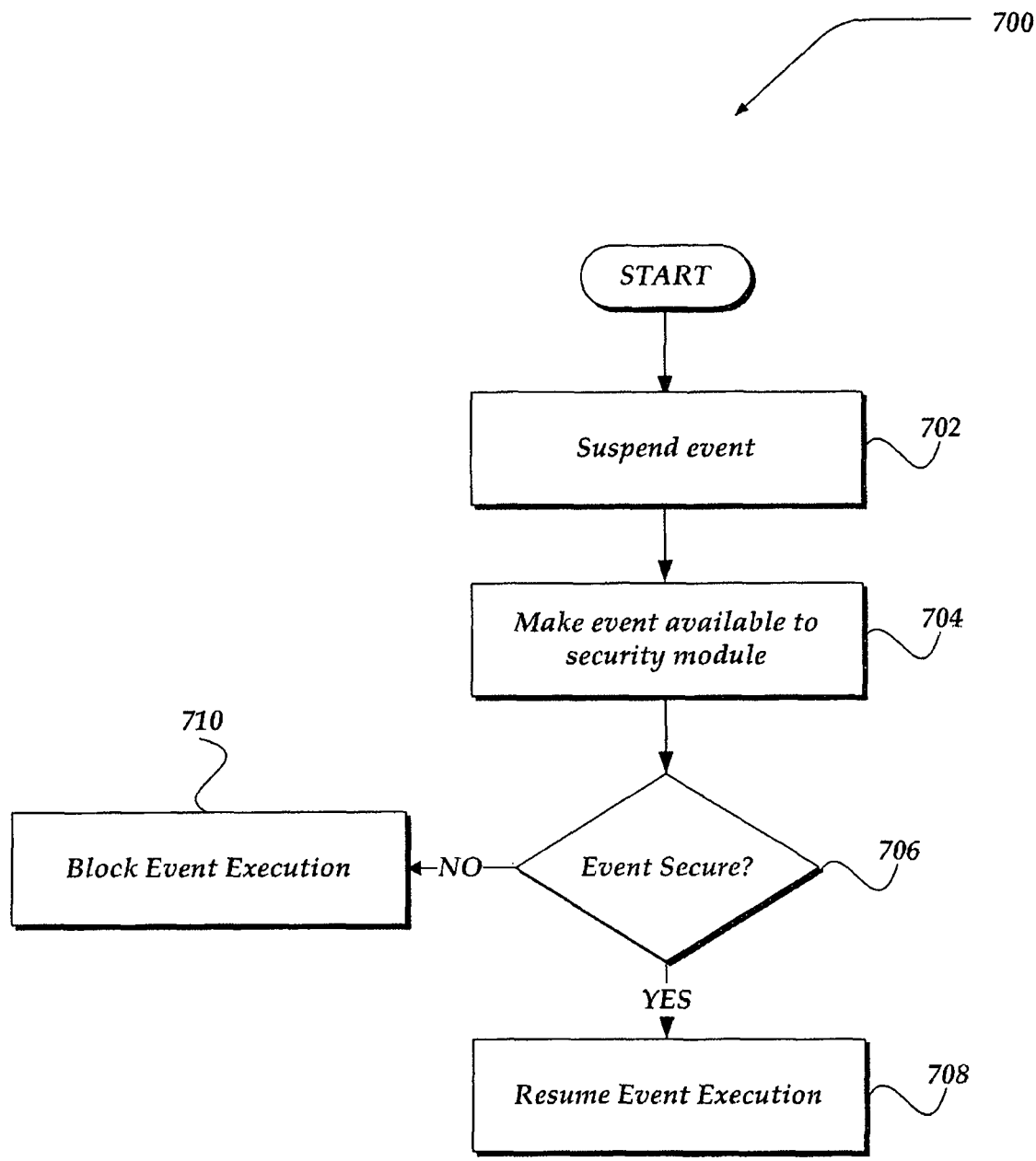
FIG. 7 is a logical flow diagram generally showing one embodiment of a process for securing a virtualization environment by intercepting events and determining when to process them.
Figure 8:
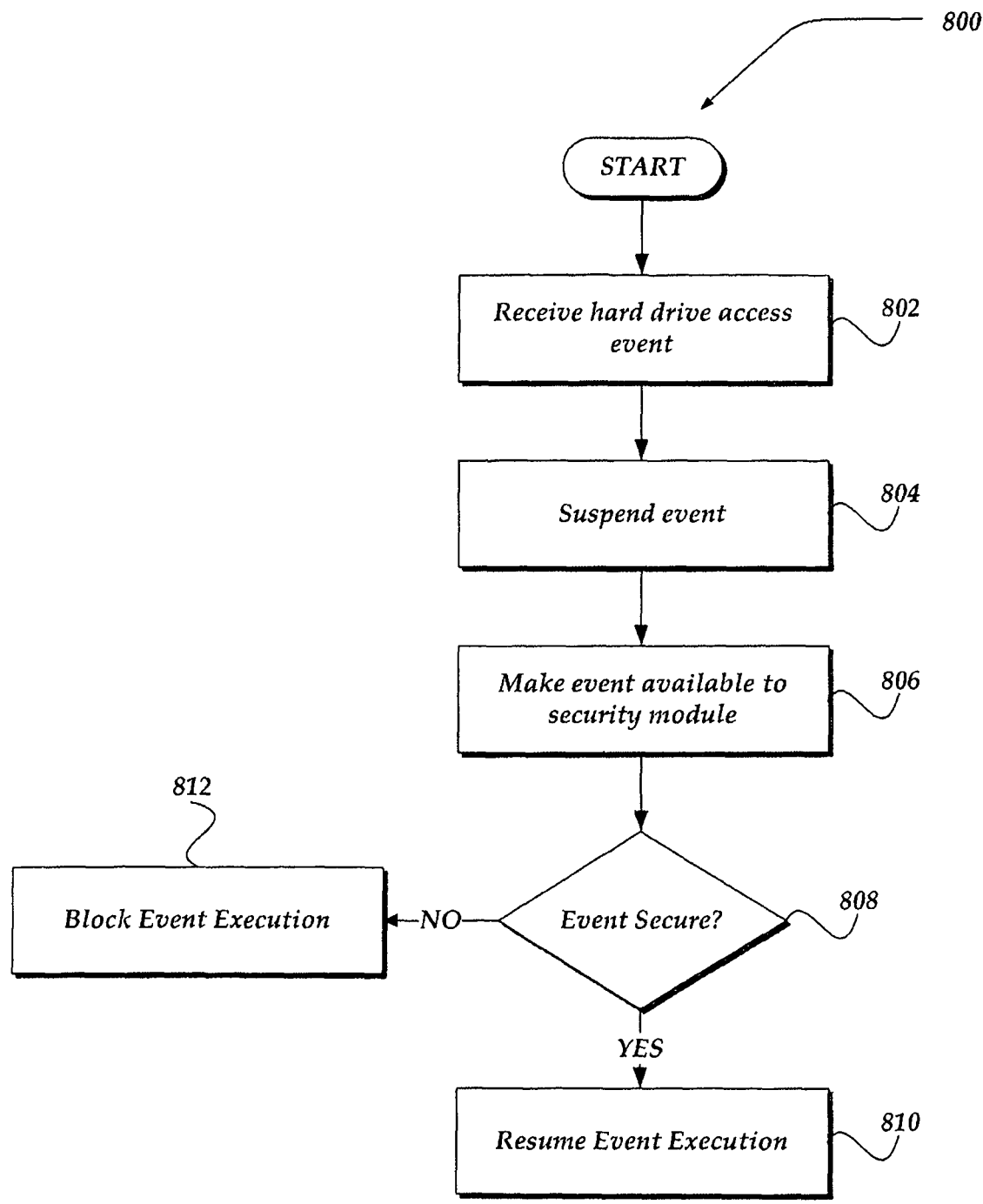
FIG. 8 is a logical flow diagram generally showing one embodiment of a process for securing a virtual storage device against malware.

The operation of certain aspects of the invention will now be described with respect to FIGS. 7-8. FIG. 7 illustrates a logical flow diagram generally showing one embodiment of a process for determining whether to execute an event. Process 700 of FIG. 7 and process 800 of FIG. 8 may be implemented within virtualization environment security module 114 of FIG. 1.

Process 700 begins, after a start block, at block 702, where a kernel mode event is suspended by an SMT provider in kernel mode. Processing continues next to block 704, where the event is made available to a security module. In one embodiment, the security module is an SMT client executing in user mode of the virtualization environment. In one embodiment, the suspended event includes a user mode event.

At block 706, it is determined whether the event originates from code that is secure to execute, and should be allowed to execute, or if the event is the execution of malware, and should be blocked.

At block 708, if it was determined that the event originated from code that is secure, then the SMT provider may resume execution of the event.

At block 710, if it was determined that the event originated from code that is the execution of malware, then the SMT provider may block execution of the event.

Process 800 begins, after a start block, at block 802, where a kernel mode event associated with storage device access is received. At block 804 the received event is suspended by an SMT provider. Processing continues next to block 806, where the event is made available to a security module. In one embodiment, the security module is an SMT client executing in user mode of the virtualization environment.

At block 808, it is determined whether the event originates from code that is secure to execute, and should be allowed to execute, or if the event is the execution of malware, and should be blocked.

At block 810, if it was determined that the event originated from code that is secure, then the SMT provider may resume execution of the event.

At block 812, if it was determined that the event originated from code that is the execution of malware, then the SMT provider may block execution of the event.

In light of the forgoing description of the invention, it should be recognized that the present invention can be realized in hardware, software, or a combination of hardware and software. A method for providing a trusted secure desktop according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method implemented on a computing device for securing a virtualization environment against malware, comprising:
   suspending an event in a kernel mode of a first guest operating system running on top of a first virtual machine created by virtualization platform software;
   making the event available to a user mode security module of the first guest operating system;
   performing, by the user mode security module, a security analysis of the event;
   performing the following operations if the security analysis indicates execution of the event is not secure,
      blocking execution of the event,
      communicating information specifying an existence of a malicious event from the first guest operating system to a security component of the virtualization environment,
      sending a communication alerting of the existence of the malicious event from the virtualization environment to a second guest operating system running on top of a second virtual machine created by the virtualization platform software, where the first and second virtual machines are separate and distinct virtual machines that are concurrently existing within the virtualization environment prior to, during, and subsequent to the time the security analysis is performed, and
      terminating execution of the first guest operating system; and
   resuming execution of the event if the security analysis indicates execution of the event is secure.

2. The method according to claim 1, wherein the event is one of the group consisting of an interrupt request, a function call, and an operating system message.

3. The method according to claim 1, wherein the method secures a non-virtualization operating system against malware.

4. The method according to claim 1, wherein the event is intercepted from one of the group consisting of an interrupt request table, a device driver, an operating system (OS) object manager, an OS service dispatch table, a Portable Execution (P/E) export table, and an executable instruction.

5. The method according to claim 1, wherein the event originated in a hardware device.

6. The method according to claim 1, further comprising receiving the event directly from a source module.

7. The method according to claim 1, wherein the event is selected from the group consisting of a kernel mode event and a user mode event.

8. The method according to claim 1, wherein a plurality of user mode security modules receive the event, and each of the plurality of user mode security modules are capable of determining whether execution of the event is secure.

9. The method according to claim 1, wherein the user mode security module redirects the event to another module for additional processing before allowing the suspended event to be resumed.

10. The method according to claim 1, wherein the security module modifies the event before allowing the suspended event to be resumed.

11. The method according to claim 1, wherein the security analysis is based in part on determining whether malware initiated the event.

12. The method according to claim 1, wherein the event is one of a series of related events, and wherein the security analysis is based in part on determining whether the event was preceded by at least one of the series of events.

13. The method according to claim 1, further comprising detecting code injected into the virtualization environment by:
   scanning for a portion of memory that is inaccessible to the virtualization environment;
   identifying a file on a storage device associated with the portion of inaccessible memory; and
   determining when the file on the storage device associated with the portion of inaccessible memory includes malware.

14. A computer system for securing a virtual storage device stored on a physical storage device, comprising:
   a computer readable medium having a plurality of instructions stored thereon; and
   at least one processing device communicatively coupled to the computer readable medium and configured to execute the plurality of instructions that cause the computer system to perform actions comprising:
      receiving an access event for the physical storage device;
      suspending the physical storage device access event in a first guest operating system running on top of a first virtual machine created by virtualization platform software;

making the physical storage device access event available to a user mode security module of the first guest operating system;

performing, by the user mode security module, a security analysis to determine whether to block or allow the physical storage device access event, the security analysis based in part on whether the physical storage device access event originated from a virtual storage device driver in the first guest operating system;

performing the following operations if it is determined that the physical storage device access event is to be blocked, blocking execution of the physical storage device access event, communicating information specifying an existence of a malicious event from the first guest operating system to a security component of a virtualization environment, sending a communication alerting of the existence of the malicious event from the virtualization environment to a second guest operating system running on top of a second virtual machine created by the virtualization platform software, where the first and second virtual machines are separate and distinct virtual machines that are concurrently existing within the virtualization environment prior to, during, and subsequent to the time the security analysis is performed, and terminating execution of the first guest operating system; and resuming execution of the physical storage device access event if the indication is to allow the physical storage device access event.

15. The computer system according to claim 14, wherein the user mode security module redirects the physical storage device access event to an encryption module when the event includes a write event, and wherein the security module redirects the physical storage device access event to a decryption module when the event includes a read event.

16. The computer system according to claim 14, wherein the user mode security module is executed in kernel mode.

* * * * *